(12) United States Patent
Blatchley et al.

(10) Patent No.: US 6,870,698 B2
(45) Date of Patent: Mar. 22, 2005

(54) DRUM ELECTRONICS CONTROL INTERFACE AND PROTOCOL FOR RECORDING/REPRODUCING APPARATUS

(75) Inventors: Michael Blatchley, Longmont, CO (US); Mark A. Hennecken, Parker, CO (US)

(73) Assignee: EXAByte Corp., Boulder, CO (US)

(*) Notice: Subject to any disclaimer, the term of this patent is extended or adjusted under 35 U.S.C. 154(b) by 375 days.

(21) Appl. No.: 09/973,248

(22) Filed: Oct. 9, 2001

(65) Prior Publication Data

US 2003/0072098 A1 Apr. 17, 2003

(51) Int. Cl.[7] .................................. G11B 5/09
(52) U.S. Cl. ............................. 360/51; 360/46
(58) Field of Search .................. 360/27, 51, 46; 710/1; 714/798, 819

(56) References Cited

U.S. PATENT DOCUMENTS 6,088,183 A * 7/2000 Nelson ................... 360/75
6,421,196 B1 * 7/2002 Takayama et al. ......... 360/71

* cited by examiner

*Primary Examiner*—David Hudspeth
*Assistant Examiner*—Daniell L. Negrón
(74) *Attorney, Agent, or Firm*—The Law Office of Jessica Costa, PC; Jessica Costa

(57) ABSTRACT

A method and apparatus for allowing communication between a stationary circuit and circuitry in motion with respect to the stationary circuit is presented. Communication is achieved and verified by transmitting a clock signal and a control signal in synchronization with the clock signal over separate clock and control transformer channels between the stationary circuit and the moving circuitry.

9 Claims, 8 Drawing Sheets

DRUM ELECTRONICS CONTROL INTERFACE AND PROTOCOL FOR RECORDING/REPRODUCING APPARATUS

FIELD OF THE INVENTION

The present invention pertains generally to magnetic recording and/or reproducing devices, and more particularly, to a control interface for rotary electronics situated on a rotary drum.

BACKGROUND OF THE INVENTION

In a magnetic recording/reproducing device such as a tape drive having a rotary head assembly, the magnetic heads are mounted adjacent to the outer periphery of the rotating position of the drum (hereinafter "rotor") so that the heads can scan a flexible, magnetic tape as the latter is disposed adjacent to and moves along a portion of the path of travel of the heads.

In the prior art the rotor which mounts the heads has a transformer at the center thereof so that the data signals sensed by the heads during a read mode can be directed to circuitry which is external to the rotary head assembly itself. Also, for a record mode, the transformer interconnects the data signal source with at least one of the heads. In either mode, the head or heads are connected directly to the transformer.

The foregoing practice presents a noise and signal distortion problem due to the separation of the amplifier circuitry from the heads. Such noise is added to the data signal from the heads in a read mode and amplified in the circuitry external to the rotor.

Accordingly, movement is being made in the industry from the above prior art rotor assembly to a rotor assembly having a number of heads mounted thereon and having amplifier means coupling each head, respectively, with the transformer. In this way, the data signals sensed by the heads during a read mode are amplified before being directed to the transformer. Thus, any noise generated by the transformer itself will represent only a relatively small fraction of the signal transferred by the transformer to the electronic circuitry externally of the drum assembly. The signal-to-noise ratio of the data signals, therefore, is relatively high.

In a similar manner, the head assembly can also include a write signal amplifier mounted on the rotor along with the read signal amplifiers for the heads. Thus, data signals to be recorded need not be amplified until they have passed through the transformer to thereby assure fast current rise times needed for recording at higher flux densities.

While the repositioning of the readback and recording amplifiers and other associated electronics (e.g., control circuitry) within the rotor of the drum itself is desirable for the reasons set forth above, several difficulties exist with the implementation of such a design. Foremost is the development of a control interface between the stationary drive electronics and the rotating rotor electronics to allow control thereof. Noise generated by the rotating drum often causes control signal transmission errors or dropouts, resulting in control command misinterpretation, thereby setting the rotating control electronics to perform unintended operations.

Accordingly, a control interface is needed to allow accurate communication between control electronics situated on the stationary tape drive electronics and the rotating drum electronics to allow signals generated by the controller and needed by the drum electronics to function to be sent with as much accuracy and speed as possible. Preferably, the interface is implemented using as few control channels as possible.

SUMMARY OF THE INVENTION

The present invention is a novel control interface for allowing and verifying communication between stationary drive electronics and moving electronics positioned on a rotary drum. Communication is achieved and verified by transmitting a clock signal and a control signal in synchronization with the clock signal over separate clock and control transformer channels between the stationary drive electronics and moving electronics.

In accordance with the invention, the interface includes a clock transformer channel which couples a clock signal from a clock circuit located in the drive circuitry to the moving electronics on the spinning rotor. The interface also includes a control transformer channel which couples a control signal in synchronization with the clock signal from the stationary drive electronics to the moving rotor electronics. A system controller mounted on a stationary circuit board in the drive generates control and data signals that are coupled via the control transformer, in synchronization with the clock signal, to a rotor controller mounted on the rotor. Response signals generated by the rotor controller are coupled via the control transformer, in synchronization with the clock signal, back to the system controller on the stationary circuit board of the drive.

The control interface allows a system controller mounted in the stationary drive electronics to send command and data signals to a rotor controller on the moving circuitry. Prior to executing commands received from the system controller, the rotor controller echoes the received commands back to the system controller prior to setting these states. After these control states are verified, an "execute" command is sent to the rotor controller to execute the command. Preferably, after receipt of each command from the system controller, the rotor controller generates a verification signal indicating the command received. In the preferred embodiment, the verification signal is an echo of the received command. If the verification signal received by the system controller indicates that the received command matches the sent command, the system controller then sends an execute command to allow the rotor controller to go ahead and execute the command. This command verification minimizes the likelihood of implementing a command that could cause unintended operations by the rotor electronics, and even potentially destroy data on the tape.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

A novel control interface for allowing control of electronics positioned on the spinnable rotor of a tape drive drum by stationary drive electronics is described in detail hereinafter.

Figure 1:
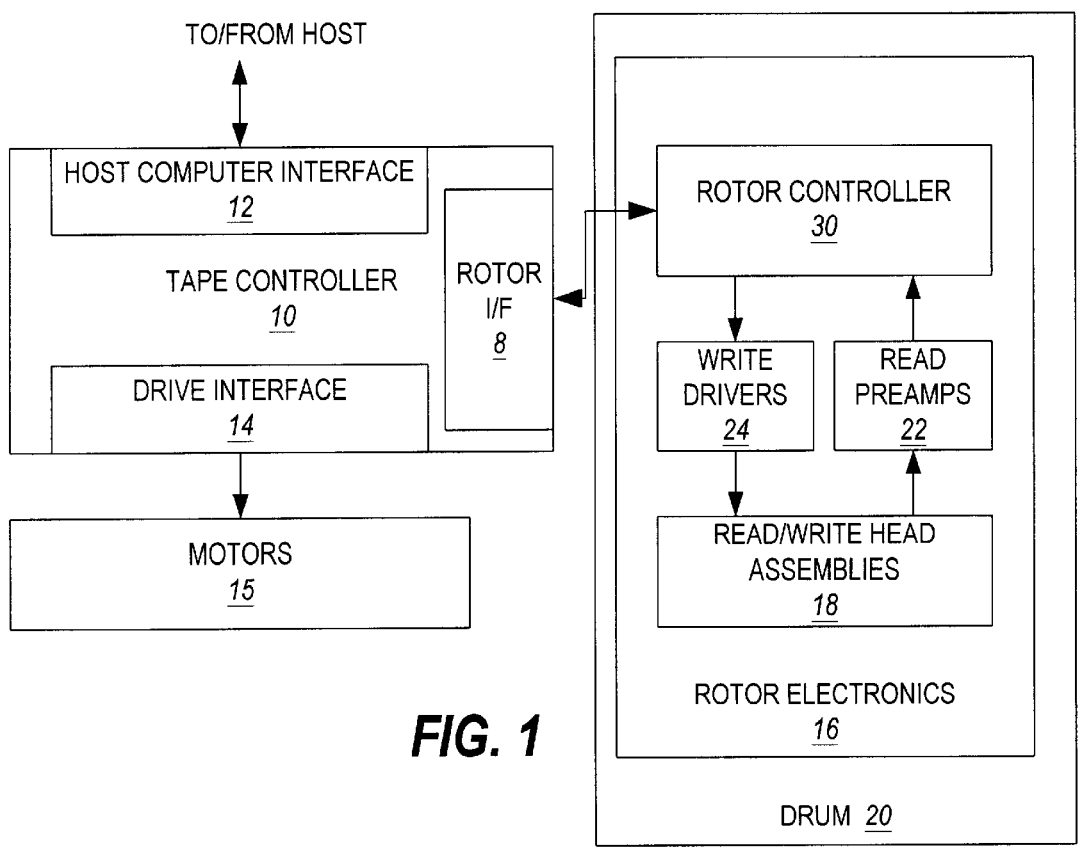
FIG. 1 is a block diagram illustrating the functionality of a tape drive in accordance with the invention.

FIG. 1 is a block diagram illustrating the functionality of a tape drive in accordance with the invention. Controller 10 performs a variety of functions. In one capacity, controller 10 receives commands, requests and data from a host computer (not shown) via host computer interface 12. In a recording mode controller 10 formats data received from the host into track packets to be sent to the rotor electronics 16 for transfer to the magnetic media (not shown). In a read mode, controller 10 receives track packets recovered from the media by rotor electronics 16 and converts the recovered track packets into data block format required by the host and sends the data blocks to the host via host computer interface 12.

In another capacity, controller 10 controls the speed and direction of all tape drive motors 15 via drive interface 14.

In another capacity, controller 10 communicates with the rotor electronics 16, and in particular with a rotor controller 30, via a rotor interface 8. Communication includes commands, responses, and data (in the form of track packets).

Importantly, rotor electronics 16 is positioned on the spinnable portion of the drum 20, called the "rotor". Rotor electronics 16 includes a rotor controller 30 which receives and processes commands and data to the rotor interface 8 of tape controller 10, and sends responses and data to the rotor interface 8 in response to received commands. Write drivers 24 manage the conversion of digital data received from the tape controller 10 into analog signals sent to the write head assemblies 18. Read preamps 22 amplify the analog signals detected by the read head.

Figure 2:
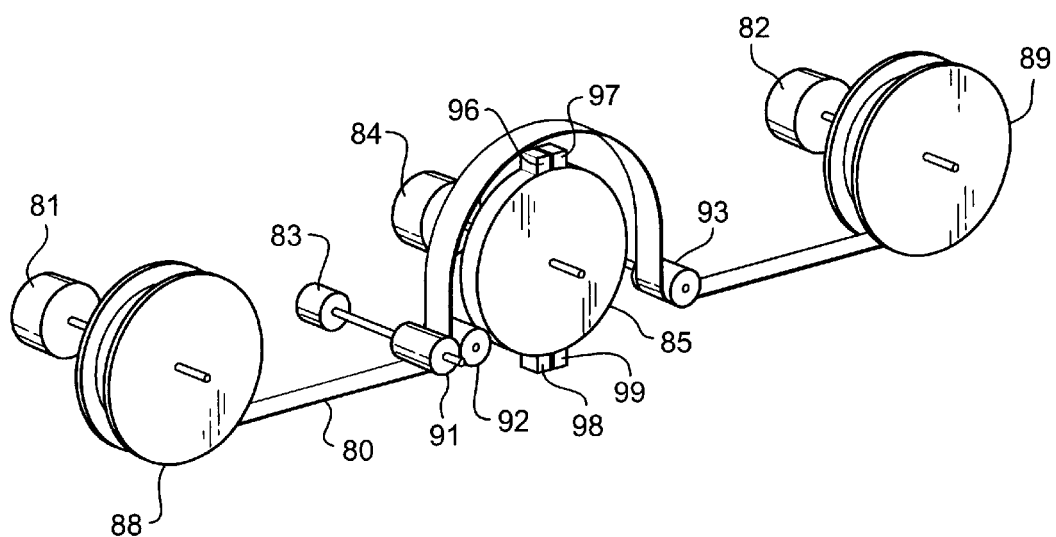
FIG. 2 is a top angular view of the tape path resulting from one arrangement of tape drive motors of a helical scan tape drive.
Figure 3:
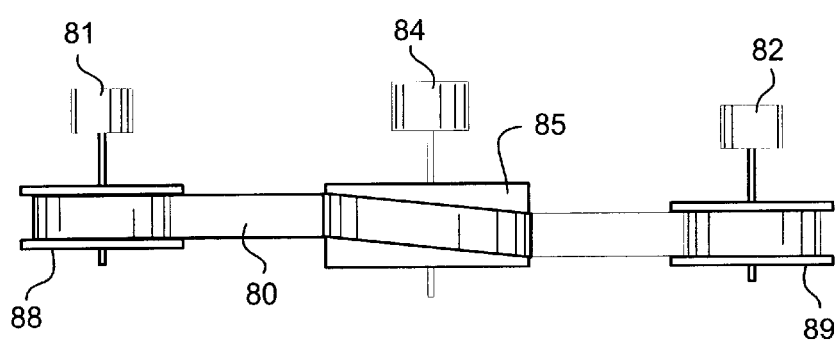
FIG. 3 is a side view of the tape path resulting from one arrangement of tape drive motors of a helical scan tape drive.
Figure 4:
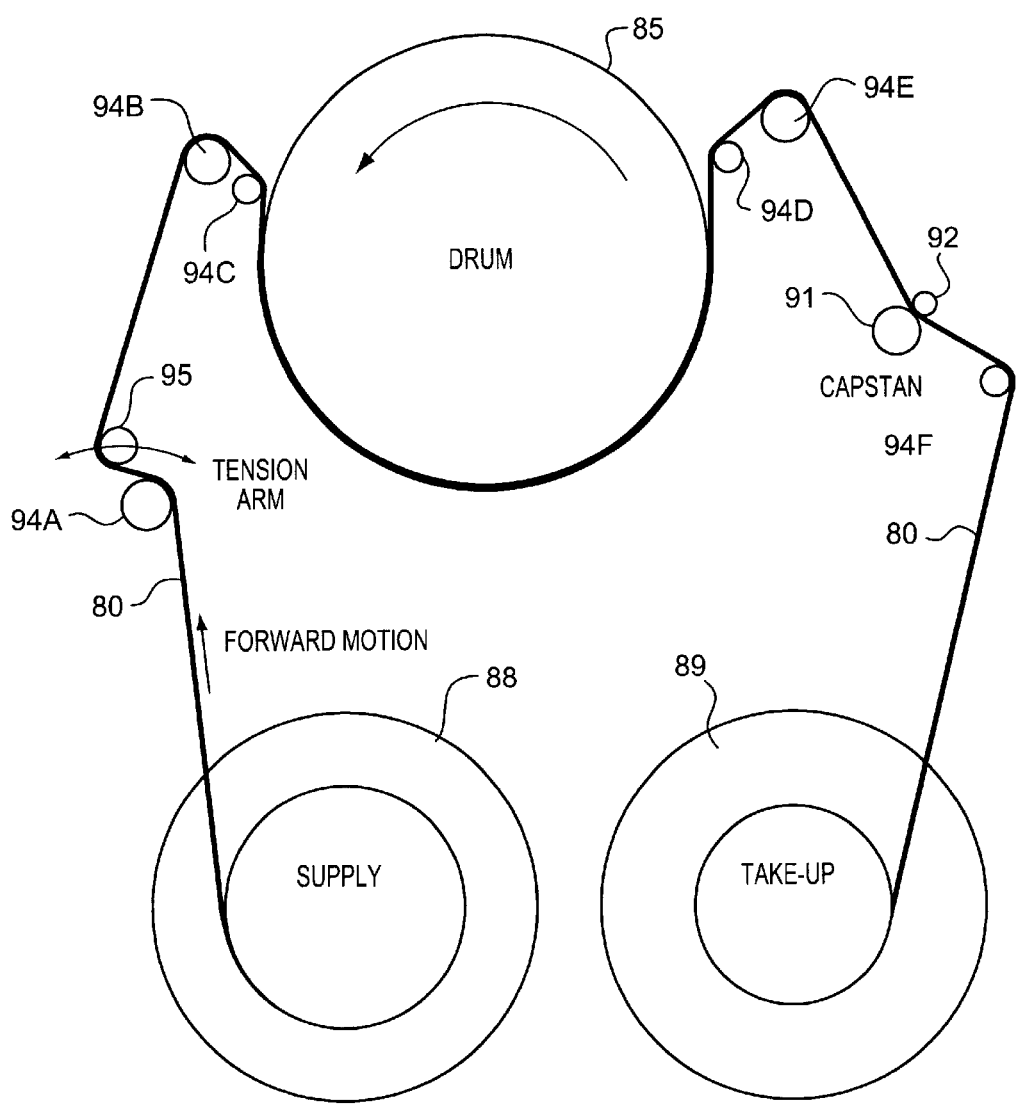
FIG. 4 is a top view of the tape drive configuration of FIGS. 2 and 3, illustrating the path followed by tape.

Referring now to FIGS. 2–4, motors 15 of FIG. 1 includes (among other possible motors) reel motors 81 and 82, capstan motor 83, and drum motor 84. Tape 80 circulates between supply reel 88 and take-up reel 89 after passing over a series of idler rollers 94a, 94b, 94c, 94d, 94e, and 94f, a biased tension arm and roller 95, and between capstan 91 and pinch roller 92. Reel motors 81 and 82 drive the supply 88 and take-up 89 reels of a loaded tape cartridge to transport the tape 80 in either the forward or reverse direction. Capstan motor 83 drives capstan 91, which is responsible for regulating tape speed, and is capable of driving the tape 80 in the forward or reverse direction. Drum motor 84 drives the rotor which has mounted thereon the read/write heads 96, 97, 98, 99 that scan the surface of the tape 80 in a helical pattern so as to magnetically exchange data between the heads 96–99 and tape 80 as the tape 80 passes over the periphery of the drum 85.

Figure 5:
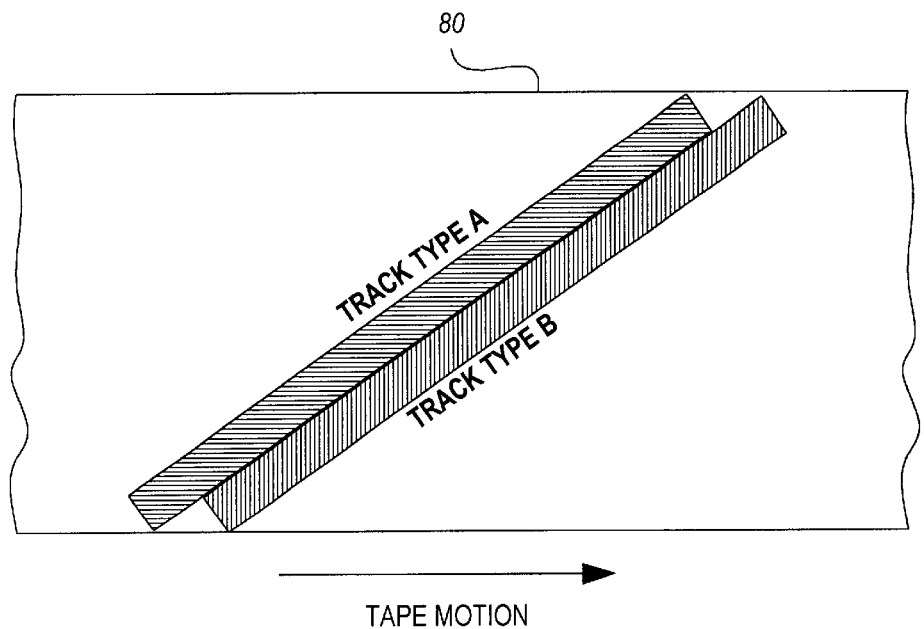
FIG. 5 is a side view of a magnetic tape illustrating helical scan tracks recorded thereon.

In the illustrative embodiment, the tape drive operates with an 8 mm tape cartridge and records tracks in a helical scan pattern, shown in FIG. 5, with tracks A and B recorded in a helical pattern at alternate azimuths by heads 96–99. That is, a pair of alternate azimuth data tracks are recorded simultaneously at an angle across the tape by a pair of alternate azimuth adjacent write heads. Tape controller 10 maintains the period of drum rotor 85 and speed of tape 80. Data is checked half a drum rotation after recording by a pair of alternate azimuth CAW heads located 180 degrees relative to the pair of write heads, and data with errors detected is re-written.

Figure 6:
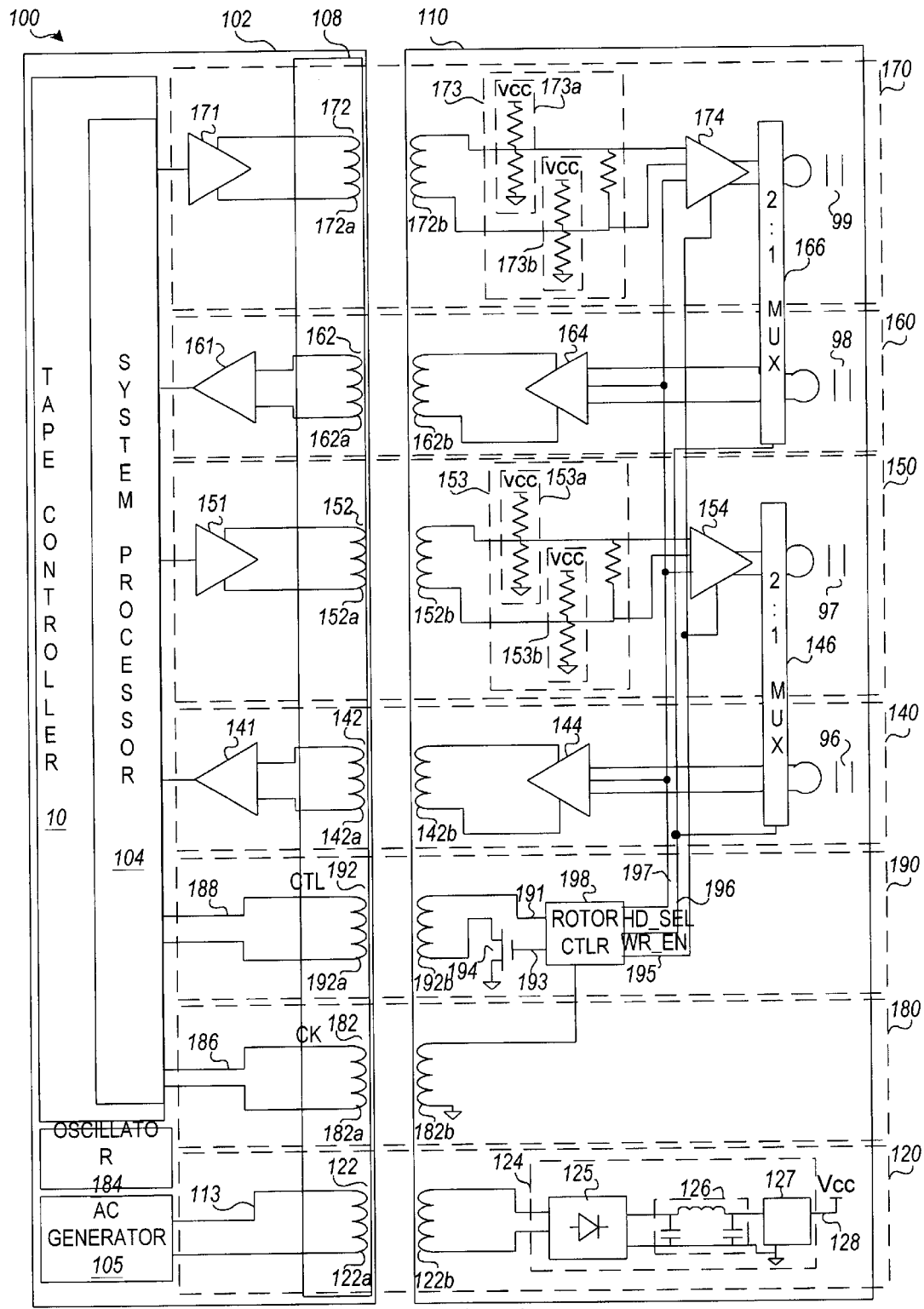
FIG. 6 is a schematic block diagram of a preferred embodiment of the drum electronics of a tape drive in accordance with the invention.

FIG. 6 is a schematic block diagram of a preferred embodiment of the drum electronics of a tape drive 100 in accordance with the invention. As illustrated, tape drive 100 includes, among other components, a main system board 102 having a system processor 104 mounted thereon to control the recording and playback operations of the drive, and a drum 85. The drum 85 comprises a fixedly mounted stator 108 and a spinnable rotor 110 rotatably mounted around the periphery of stator 108. Rotary magnetic heads 96, 97, 98, 99 are mounted on the periphery of the rotor 110.

Stator 108 is coupled to an alternating current (AC) power generator 105 which supplies power to the rotor 110 via a power channel 120. Power channel 120 includes a rotary power transformer 122 with one coil 122a coupled to the AC generator 105 and the other coil 122b coupled to regulator circuit 124. Regulator circuit 124 comprises a bridge rectifier 125 followed by a filter 126 and voltage regulator 127. The alternating power signal generated by power generator 105 is coupled from coil 122a on the stator 108 to coil 122b on the rotor 110. Bridge rectifier 125 rectifies the alternating power signal, while the filter 126 and voltage regulator 127 smoothes the rectified signal to produce a DC signal 128. In the illustrative embodiment, AC power generator 105 generates a 12 Volt, 1.5 to 2 Watt, 20 to 50 kilohertz AC signal 113. Power transformer 122 has an inductance of 2 to 5 millihenries with a 3:2 stator to rotor ratio. Bridge rectifier 125 is preferably 1 Amp, SMT with $V_R<50$ Volts and $V_F<1.1$ Volts. Filter 126 is preferably implemented with a 4.7 to 10 microfarad tantalum SMT capacitor. Voltage regulator 127 is preferably a 5 Volt DC, 250 milliamp, $V_F<0.2$ Volt linear regulator.

Also in the illustrative embodiment, tape drive 100 includes two separate read channels $A_R$140 and $B_R$160, and two separate write channels $A_W$150 and $B_W$170. Read channel $A_R$140 includes read head 96, read head 97, read preamplifier 144, and analog multiplexer 146 all located on the rotor 110. Read channel $A_R$140 also includes read buffer 141 positioned on the main system board 102. A read channel $A_R$ rotary transformer 142 includes a coil 142b coupled to the rotor 110 and a coil 142a coupled to the stator 108. When enabled by the rotor controller 30 (discussed hereinafter), one of read head 96 or read head 97 is selected according to the state of multiplexer 146. The selected head 96 or 97 senses data as it passes over the magnetic tape (80 in FIGS. 2–5). Preamp 144 conditions and amplifies the sensed data, and transformer 142 couples the conditioned and amplified data from the rotor 110 to the stator 108, where it is buffered by read buffer 141 and processed by processor 104.

Similarly, read channel $B_R$160 includes read head 98, read head 99, read preamplifier 164, and 2:1 analog multiplexer 166, all located on the rotor 110. Read channel $B_R$16 also includes and read buffer 161 positioned on the main system board 102. A read channel $B_R$ rotary transformer 162 includes a coil 162b on the rotor 110 and a coil 162a on the stator 108. When enabled by rotor controller 30, one of read head 98 or read head 99 is selected according to the state of multiplexer 166. The selected head 98 or 99 senses data as it passes over the magnetic tape. Preamp 164 conditions and amplifies the sensed data, and transformer 162 couples the conditioned/amplified data from the rotor to the stator, where it is buffered by read buffer 161 and processed by processor 104.

Write channel $A_W$ 150 includes a write driver 151 positioned on the main system board 102. Write channel $A_W$ also includes a write driver 154, write head 96, write head 97, and multiplexer 146 positioned on the rotor 110. A write channel $A_W$ rotary transformer 152 includes a coil 152a coupled to the stator 108 and a coil 152b coupled to the rotor 110. When the tape drive is recording data to tape, write channel $A_W$ transformer 152 couples data to be written from write driver 151 on the main system board 102 to the write amplifier 154, where it is amplified and then written to tape by one of heads 96 or 97 as selected by multiplexer 146.

In the illustrative embodiment of the invention, the tape drive employs a simple resistor divider network 153 to set the reference DC voltage that is added to the signal coming through the transformer 152. Together the resistor divider networks 153a, 153b bias the digital data signal going into the write driver 154. By coupling the transformer-isolated signals using the resistor divider network 153, the proper absolute voltages are obtained. Advantageously, the resistor divider circuit is passive, thereby eliminating the use of costly active circuits.

Write channel $B_W$ 170 includes a write driver 171 positioned on the main system board 102. Write channel $B_W$ also includes resistor divider network 173, write driver 174, write head 98, write head 99, and multiplexer 166 all positioned on the rotor 110. A write channel B rotary transformer 172 includes a coil 172a coupled to the stator 108 and a coil 172b coupled to the rotor 110. Write channel 170 operates similarly to write channel 150 previously described.

In accordance with the invention, the drum control interface is a 2-line serial interface comprising a separate clock channel 180 for the clock and a separate bi-directional control channel 190 for control data. System processor 104 determines the operation of the rotor electronics 16 in accordance with the internal state of the drive and commands received from the host. In particular, system processor 104 controls the rotor electronics 16 via various commands, including commands to enable the drum, turn the write current on or off, enable one or more of the read/write heads 96, 97, 98, 99, change the state of the write currents, and reset the state of the rotor electronics 16. More commands may be implemented as appropriate to the particular implementation; however, for purposes of ease of illustration, discussion is herein limited to the above-mentioned commands.

In the illustrative embodiment, control channel 190 includes a rotor controller 198 located on the rotor itself. Rotor controller 198 is preferably implemented using a programmable logic device (PLD) having an incoming command line 191 and an outgoing command line 193. Rotor controller 198 also has outgoing control lines including write enable line 195, head select line 196, and current set lines 197. Write enable line 195 is connected to the enable input of each of the write drivers 154 and 174 on the rotor 110 and is used to either enable or disable writing to the tape depending on whether the tape drive is set in the recording or the read mode. Head select line 196 is used to select the head for each channel A and B being read from or written to. Current set lines 197 are used to set the amount of write current in the write drivers 154, 174. In the preferred embodiment, the write current is set using a simple programmable resistor array that determines the amount of current going through the write head when the data is written to the tape.

The control interface of the invention also includes a separate clock channel 180 which supplies the clock signal to the rotor electronics. It is advantageous to place the oscillator 184 that generates the clock signal CK 186 for the rotor electronics 16 on the main system board 102 since this placement provides isolation that prevents the magnetic read heads from picking up the clock signal. In accordance with the control interface of the invention, the control clock signal CK 186 is turned on only when a control communication takes place. The control clock signal CK 186 is a square wave that is coupled from the stator coil 182a to the rotor coil 182b of the clock transformer 182 and is received at the clock input 199 of the rotor controller PLD 198 to cycle the state machine implemented therein (discussed hereinafter in FIG. 8).

Control channel 190 is a bi-directional channel. A FET transistor switch 194 is used to set the direction of communication between the system processor 104 and rotor controller 198. When receiving control signals (i.e., commands), the rotor controller 198 holds the gate of the FET switch 194 to VCC, thereby disabling output signals on output line 193 from being coupled over control transformer 192 and providing a ground reference to the transformer. Serial square-wave control signals 188 are transmitted by the system processor 104 to the stator coil 192a of the control transformer 192. The control transformer 192 couples the signal to the rotor coil 192b of the control transformer 192, and the coupled serial square-wave control signal 191 (which is by this time is slightly rounded due to the coil coupling) is detected and decoded by the rotor controller 198. As mentioned previously, rotor controller 198 implements a state machine, discussed hereinafter. Once a full command is received and decoded, the rotor controller 198 echoes the received command back to the system processor 104.

When transmitting the echoed command signals back to the system processor 104, rotor controller 198 serially transmits the digital bits of the received command onto output line 193, generating a square wave pattern that corresponds to the values of the binary bits in received command. The value of each bit correspondingly opens or closes the FET switch 194, which drives the coil 192b to either a high or low voltage level, generating a square wave. The signal is coupled across control transformer 192 to the stator coil 192a, and is received and decoded by system processor 104.

If the echoed command is the same as the command sent by the system processor 104, the system processor 104 sends an EXECUTE command to the rotor controller 198. Upon receipt of the execute command, the rotor controller 198 causes the command to be executed.

If the echoed command does not match the command sent by the system processor 104, the system processor 104 sends a DISCARD command to the rotor controller 198. Upon receipt of the DISCARD command, the rotor controller 198 discards the received command.

The execute or discard command is then echoed back to the system processor 104 as an acknowledgement.

Figure 7:
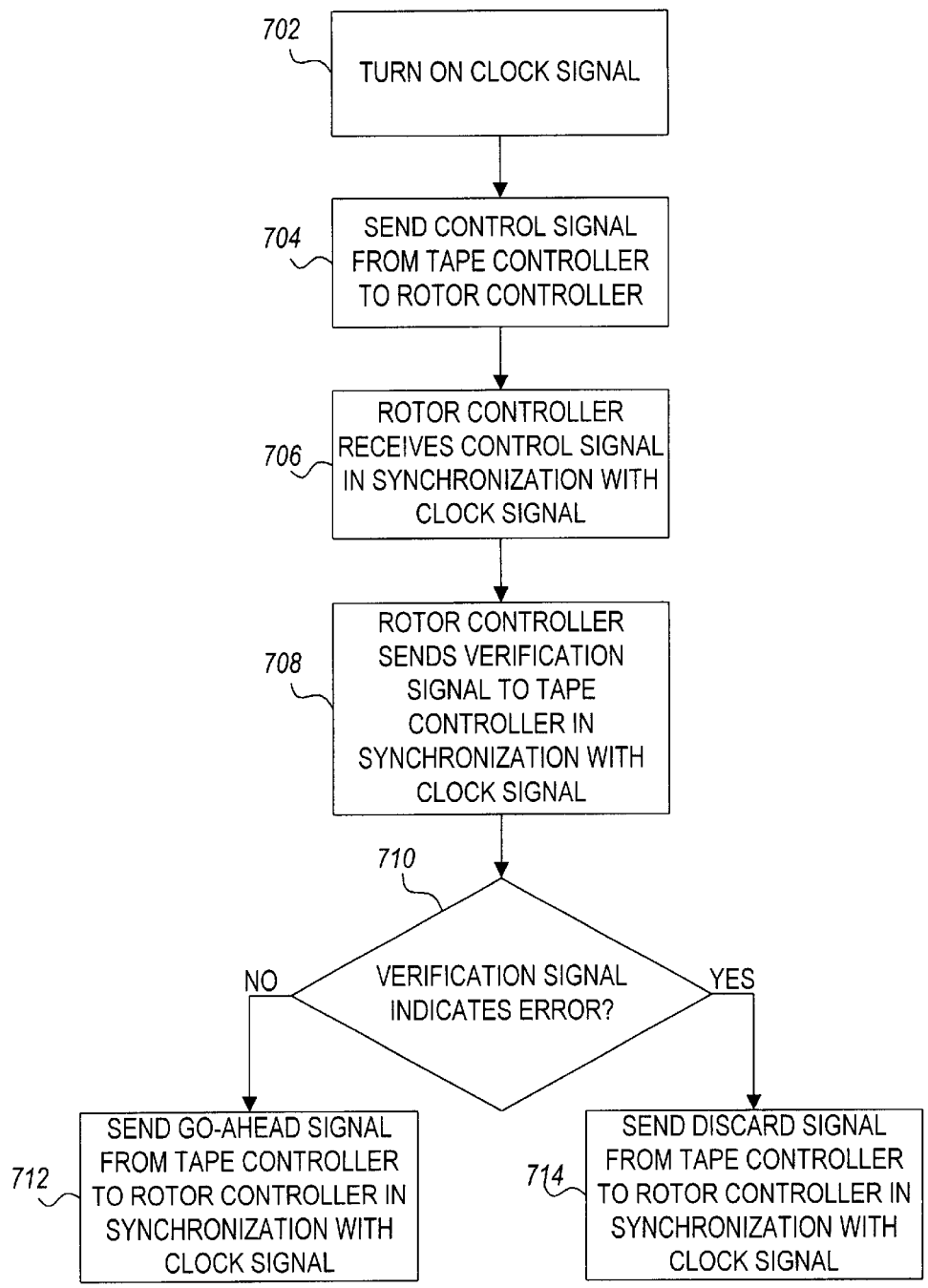
FIG. 7 is an operational flowchart illustrating the method of the invention.

FIG. 7 is an operational flowchart illustrating the method of the invention. As illustrated, when control signals are to be sent to the rotor controller 198 from the system processor 104, the clock signal CK 186 is turned on (step 702) to begin generating a square-wave over clock channel 180, and a control signal CTL 188 is sent (step 704) to the rotor controller 198 via the control channel 180.

The rotor controller 198 receives the control signal CTL 188 (step 706) over control transformer channel 190 in synchronization with the clock signal CK 186 received over clock transformer channel 180. The rotor controller 198 verifies the received control signal and produces and sends a verification signal over control transformer channel 190 in synchronization with the clock signal CK 186 (step 708). The system processor 104 processes the verification signal received from the rotor controller 198 to determine (step 710) whether the rotor controller 198 indeed received the correct command. If the verification signal indicates that the correct control signal was received by the rotor controller 198, the system processor sends a "go-ahead" signal to the rotor controller 198 (step 712), indicating that the rotor controller 198 proceed on the basis of the received control signal. If the verification signal indicates that the rotor controller 198 incorrectly received the control signal, the system processor sends a "discard" signal to the rotor controller 198 (step 714), indicating that the rotor controller 198 should discard the received control signal and await a new control signal (step 714).

Figure 8:
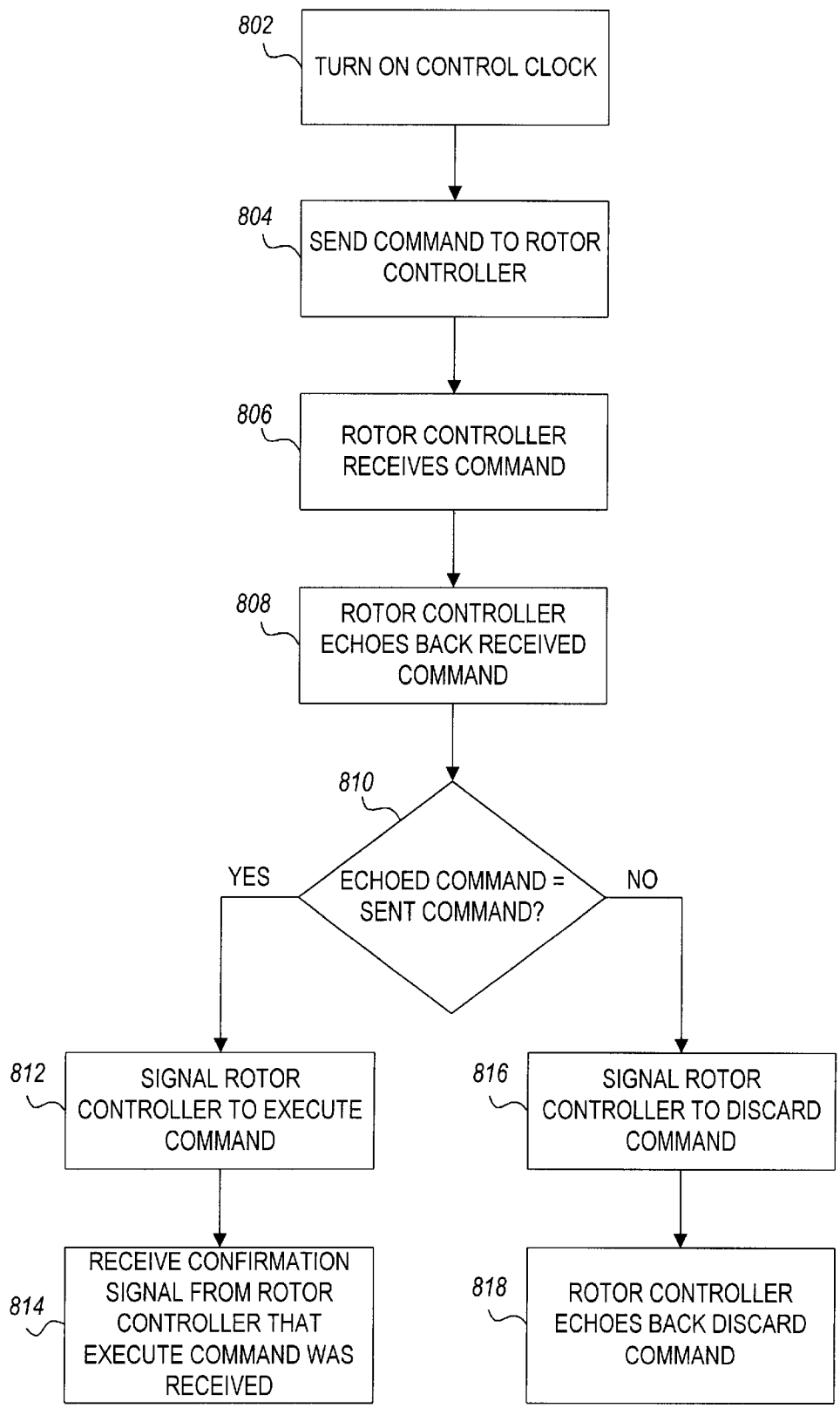
FIG. 8 is an operational flowchart illustrating one embodiment of the method of the invention.

FIG. 8 is an operational flowchart illustrating a preferred embodiment of the method implementing the control interface of the invention. As illustrated, when control signals are to be sent to the rotor controller 198 from the system processor 104, the clock signal CK 186 is turned on (step 802) to begin generating a square-wave over clock channel 180, and the command is sent (step 804) to the rotor controller 198 via the control channel 180.

In the preferred embodiment, the command includes a key portion and a data portion. Preferably, the format of the command is as follows:

| KEY | DATA |
| --- | --- |

The key portion indicates the actual command to be executed (e.g., enable write current, change write current, set heads) and the data portion is data associated with the command (e.g., write current value, selected heads, etc.).

Continuing with the method in FIG. 8, the rotor controller 198 receives the command (step 806) and then echoes the command back to the system processor 104 (step 808). The system processor 104 compares the echoed command with the command sent (step 810). If the echoed command matches the command sent, the rotor controller 198 successfully received the command; accordingly, the system processor sends an EXECUTE command to the rotor controller 198 (step 812), which causes the rotor controller 198 to execute the received command and send a verification acknowledged signal (step 814) to the system processor 104. In the preferred embodiment, the verification acknowledged signal is an echo of the EXECUTE command and may be sent immediately upon receipt of the verification signal (i.e., the EXECUTE command), thereby operating merely as an acknowledgement that the received command is good. Alternatively, the verification acknowledged signal sent after the command has been executed, thereby operating as an indicator to the system controller 104 that the command had been executed.

If the echoed command does not match the command sent, the rotor controller 198 did not successfully receive the command; accordingly, the system processor sends a DISCARD command to the rotor controller 198 (step 814), which causes the rotor controller 198 to discard the previously sent command and to wait for a new command. Preferably, the rotor controller sends an acknowledge signal indicating receipt of the DISCARD command (step 818).

As just discussed, the command format preferably includes a key and associated data. In the illustrative embodiment, the command comprises a 4-bit key followed by 3 bits of data. In particular, Table 1 illustrates a set of commands and their associated 4-bit command operation keys and accompanying 3-bit data sequences:

TABLE I

| COMMAND | KEY (binary) | DATA (binary) |
| --- | --- | --- |
| Write Drive | 1010 | 0xy, where x = write enable for channel B (0 to turn on write enable, 1 to turn off write enable), y = write enable for channel A |
| Head Select | 1001 | 00x, where x = 0 to select primary write heads, and x = 1 to select read-after- write heads |
| Change Write Current Channel A | 1000 | xyz, where xyz = 000, 001, 010, . . . , 111 (0–7 binary encoded) |
| Change Write Current Channel B | 1100 | xyz, where xyz = 000, 001, 010, . . . , 111 (0–7 binary encoded) |
| EXECUTE | 0011 | |
| DISCARD | 0000 | 000 |

Figure 9:
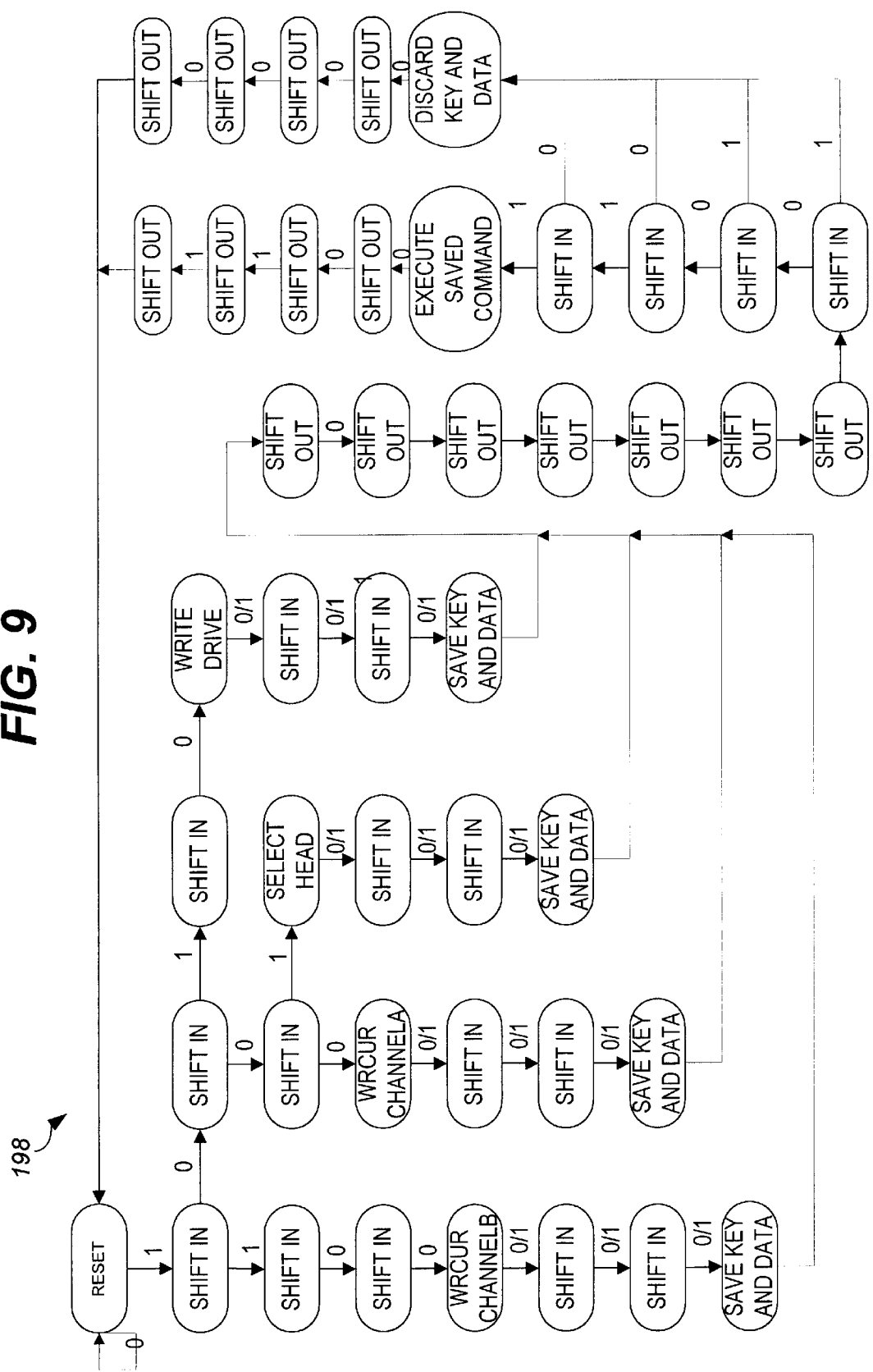
FIG. 9 is a state diagram illustrating an example implementation of the state machine implemented in a programmable logic device in accordance with the invention.

FIG. 9 is a state diagram illustrating an example rotor controller state machine 198 implementing the commands in Table 1. As shown, the state machine 198 begins in a RESET state. Command data bits serially shifted in to the state machine 198 followed by key data bits causes the state machine 198 to move into the various states shown (for example, SHIFT IN, WRCUR CHANNELB, WRCUR CHANNELA, SELECT HEAD, WRITE DRIVE, SAVE KEY AND DATA). Once the command and key are received, the state machine echoes the received command and key by shifting out the received bits (states SHIFT OUT). The state machine then shifts in the bits indicating the response command (EXECUTE or DISCARD), and acts accordingly. Upon appropriately executing the command or discarding it, the state machine acknowledges the response command by echoing the response back to the system controller. (For simplicity, error handling of commands received yet not implemented is not shown.)

Figure 10:
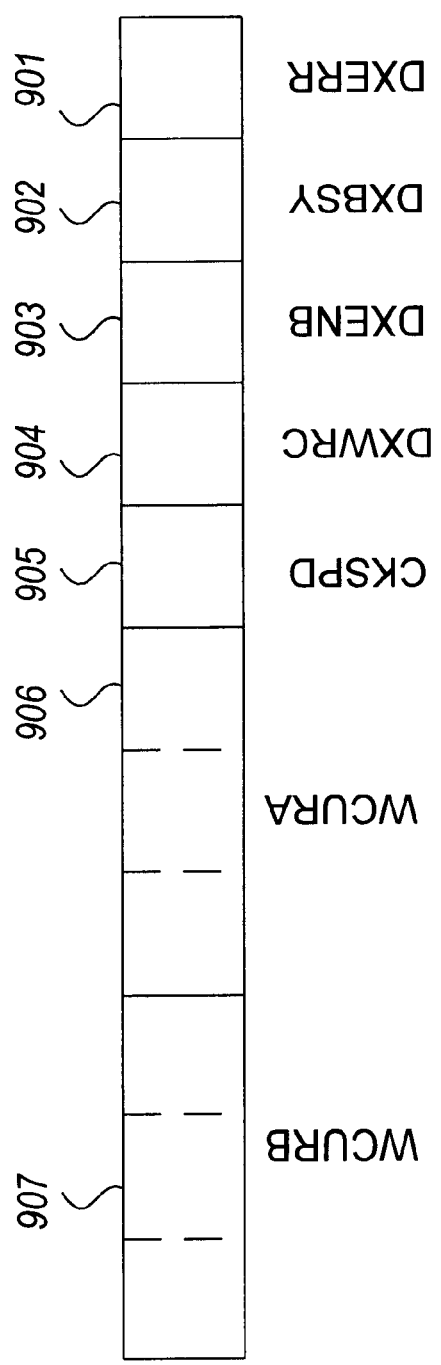
FIG. 10 is a diagram of a drum control register used by the system processor.

FIG. 10 is a diagram of a drum control register 900 used by the system processor 104 and dedicated to drum control. As illustrated, drum control register 900 comprises a set of bits, including DXERR 901, DXBSY 902, DXENB 903, DXWRC 904, CKSPD 905, WCURA 906, and WCURB 907.

In the preferred embodiment, in order to turn on or off the write currents or enable one or more of the read/write heads, drum transmit bit DXENB 903 must first be set (i.e., enabled). If the drum transmit bit DXENB 903 is not enabled, the system processor 104 ignores any requests to turn on or off the write currents or enable/disable any of the read/write heads or any other commands that affect the rotor electronics. To enable the drum transmit, the drive firmware must write a 1 to bit DXENB in drum control register 900. Once set, bit DXENB 903 may be reset by firmware at any time, thus preventing the propagation of rotor electronics control commands to the rotor controller 198. Bit DXENB 903 is also reset (as discussed hereinafter) when a transmission error occurs between the system processor 104 and rotor controller 198.

Whenever the rotor controller 198 is involved in performing an operation initiated by the tape drive firmware, busy bit DXBSY 902 is set to indicate that the rotor controller 198 is busy. This is a read-only bit and is not modifiable by firmware, but may be polled by firmware to ensure requests are granted.

To program the write currents, the tape drive firmware sets the write current values in write current bits WCURA 906 and WCURB 907. In the preferred embodiment, the write current values are each 3-bit binary values ranging from 0 to 7 binary encoded. These 3-bit values are used to program the resistor array (not shown) in the write drivers 154 and 174. After setting the write current via these bits, the firmware must write a 1 to the write current transmit bit DXWRC 904 in control register 900. As soon as the hardware has acknowledged the request to change the write currents, it will set the busy bit DXBSY 902 in control register 900. Once the rotor controller 198 successfully executes the write current change, the busy bit DXBSY 902 is reset. This protocol provides a safeguard to ensure that no commands sent to the rotor are missed.

The rotor control interface as described herein ensures that transmission errors that occur between the system processor 104 and rotor controller 198 are detected and aborted prior to execution. When a transmission error is detected using the protocol described herein, read-only error bit DXERR 901 is set automatically by the hardware to indicate that the attempted operation failed. The transmit error bit DXERR 901 in control register 900 must be reset before the drum transmit enable bit DXENB 903 can be set again. To reset error bit DXERR, the firmware writes a 0 to bit DXERR 901 of control register 900.

System processor 104 is responsible for sending the serial clock signal CK 186 via clock channel 180 along with the rotor control command signals 188 via control channel 190. The clock signal CK 186 is necessary for allowing the state machine in the rotor controller 198 PLD to cycle. The clock signal CK 186 may be selected to run at one of two speeds by the firmware via the clock speed bit CKSPD 905.

Table 2 illustrates the sequence of events performed by system processor 104. The system processor 104 clocks data 188 out on the rising edge of the clock signal CK 186. Because the clock signal 186 is unidirectional but the data signal 188 is bi-directional, a significant clock skew exists from the stator 108 to the rotor 110. Accordingly, the return data 188 (received on the stator 108 side) must be clocked an appropriate delay after the rising edge of the clock signal 186. For example, if the clock rate is 5 MHz, the return data 188 may be clocked approximately 50 nS after the rising edge of the clock signal 186.

TABLE 2

| Clock Cycle ↑-rising edge; Δ-clock skew delay) | Stator-side Data Event Description | -CLOCK_ENABLE | -TRANSMIT |
| --- | --- | --- | --- |
|  |  | 1 | 1 |
| 1 ↑ | Send b3 (MSB) of command operation key | 0 | 0 |
| 2 ↑ | Send b2 of command operation key | 0 | 0 |
| 3 ↑ | Send b1 of command operation key | 0 | 0 |
| 4 ↑ | Send b0 of command operation key | 0 | 0 |
| 5 ↑ | Send b2 (MSB) of data | 0 | 0 |
| 6 ↑ | Send b1 of data | 0 | 0 |
| 7 ↑ | Send b0 of data | 0 | 0 |
| 8 | Turn data bus around for receiving data | 0 | 1 |
| 9 ↑ + Δ | Receive b3 of command operation key | 0 | 1 |
| 10 ↑ + Δ | Receive b2 of command operation key | 0 | 1 |
| 11 ↑ + Δ | Receive b1 of command operation key | 0 | 1 |
| 12 ↑ + Δ | Receive b0 of command operation key | 0 | 1 |
| 13 ↑ + Δ | Receive b2 of data | 0 | 1 |
| 14 ↑ + Δ | Receive b1 of data | 0 | 1 |
| 15 ↑ + Δ | Receive b0 of data | 0 | 1 |
| 16 | Turn data bus around for transmitting data | 0 | 1 |
| 17 ↑ | Send b3 of EXECUTE command key | 0 | 0 |
| 18 ↑ | Send b2 of EXECUTE command key | 0 | 0 |
| 19 ↑ | Send b1 of EXECUTE command key | 0 | 0 |
| 20 ↑ | Send b0 of EXECUTE command key | 0 | 0 |
| 21 | Turn data bus around for receiving data | 0 | 1 |
| 22 ↑ + Δ | Receive b3 of EXECUTE command key | 0 | 1 |
| 23 ↑ + Δ | Receive b2 of EXECUTE command key | 0 | 1 |
| 24 ↑ + Δ | Receive b1 of EXECUTE command key | 0 | 1 |
| 25 ↑ + Δ | Receive b0 of EXECUTE command key | 0 | 1 |
|  |  | 1 | 1 |

It will be appreciated from the above detailed description that the rotor control interface of the invention provides several advantages over the prior art. First, the rotor control interface ensures accurate control communication between the system board electronics and rotor electronics by providing a bidirectional handshake protocol. Second, the interface ensures isolation between the sensitive read/write heads and the clock signal oscillation. Finally, the protocol is efficient and fast yet only requires two serial lines—one for data and one for the clock.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for allowing communication between a stationary circuit and a moving circuit, said moving circuit in motion relative to said stationary circuit, comprising:

sending a clock signal present on said stationary circuit over a clock transformer channel to said moving circuit;

sending a control signal in synchronization with said clock signal from said stationary circuit over a separate control transformer channel to said moving circuit;

receiving a verification signal in synchronization with said clock signal over said control transformer channel from said moving circuit, said verification signal indicating if said control signal as received by said moving circuit is correct; and sending an execute command signal in synchronization with said clock signal over said control transformer channel to said moving circuit if said verification signal indicates that said control signal as received by said moving circuit is correct, said execute command instructing said moving circuit to execute a command indicated by said control signal.

2. A method in accordance with claim 1, wherein:

said verification signal comprises said control signal as received by said moving circuit.

3. A method in accordance with claim 2, wherein:

said verification signal indicates that said control signal as received by said moving circuit is correct if it matches said control signal as sent to said moving circuit.

4. A method in accordance with claim 1, comprising:

sending a discard signal if said verification signal indicates that said control signal as received by said moving circuit is incorrect, said discard signal instructing said moving circuit to ignore said control signal as received by said moving circuit.

5. A method in accordance with claim 1, wherein:

said stationary circuit comprises a stator of a drum; and said moving circuit comprises a rotor of a drum which rotates around said stator.

6. A control interface for allowing communication between a stationary circuit and a moving circuit, said moving circuit in motion with respect to said stationary circuit, said control interface comprising:

a clock transformer channel which couples a clock signal from said stationary circuit to said moving circuit;

a control transformer channel which couples a control signal in synchronization with said clock signal from said stationary circuit to said moving circuit, couples a verification signal in synchronization with said clock signal from said moving circuit to said stationary circuit, and couples an execute command signal in synchronization with said clock signal from said stationary circuit to said moving circuit;

a stationary circuit controller which generates said control signal, receives said verification signal, and generates said execute command signal if said received verification signal indicates that said control signal as received by said moving circuit is correct; and a moving circuit controller which receives said control signal, generates said verification signal based upon said control signal as received, and receives said execute signal, said execute command instructing said moving circuit to execute a command indicated by said control signal.

7. A control interface in accordance with claim 6, wherein:

said verification signal comprises said control signal as received by said moving circuit controller.

8. A control interface in accordance with claim 7, wherein:

said verification signal indicates that said control signal as received by said moving circuit controller is correct if it matches said control signal generated by said stationary circuit controller.

9. A control interface in accordance with claim 8, wherein:

said stationary circuit controller generates a discard signal if said received verification signal indicates that said received control signal is incorrect; and said moving circuit controller receives said discard signal coupled over said control transformer in synchronization with said clock signal coupled over said clock transformer channel, said discard signal instructing said moving circuit to ignore said control signal as received by said moving circuit controller.

* * * * *